US012517105B2

(12) United States Patent
Zhan et al.

(10) Patent No.: US 12,517,105 B2
(45) Date of Patent: Jan. 6, 2026

(54) CONE PENETROMETER AND METHOD FOR DETECTING MULTI-POLLUTANTS BASED ON TIME DOMAIN REFLECTOMETRY AND LASER INDUCED FLUORESCENCE

(71) Applicant: ZHEJIANG UNIVERSITY, Zhejiang (CN)

(72) Inventors: Liangtong Zhan, Zhejiang (CN); Qimeng Guo, Zhejiang (CN); Qingyi Mu, Zhejiang (CN); Shunyu Wang, Zhejiang (CN); Yunmin Chen, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 182 days.

(21) Appl. No.: 18/611,653

(22) Filed: Mar. 20, 2024

(65) Prior Publication Data

US 2024/0230616 A1    Jul. 11, 2024

Related U.S. Application Data

(63) Continuation of application No. PCT/CN2022/070021, filed on Jan. 4, 2022.

(30) Foreign Application Priority Data

Oct. 26, 2021  (CN) .......................... 202111247746.9

(51) Int. Cl.
*G01N 33/24*  (2006.01)
*G01N 21/17*  (2006.01)
(Continued)

(52) U.S. Cl.
CPC .......... *G01N 33/241* (2013.01); *G01N 21/33* (2013.01); *G01N 21/6402* (2013.01);
(Continued)

(58) Field of Classification Search
CPC .. G01N 21/33; G01N 21/6402; G01N 21/645; G01N 33/241; G01N 27/221
See application file for complete search history.

(56) References Cited

U.S. PATENT DOCUMENTS 10,928,376 B2 *  2/2021  Troxler .................. G01N 23/02
11,320,378 B2 *  5/2022  Zimbron ............ G01N 21/8507
(Continued)

FOREIGN PATENT DOCUMENTS

CN   203101660   7/2013
CN   103728322   4/2014
(Continued)

OTHER PUBLICATIONS

Q.Y. Mu et al., "Non-invasive time domain reflectometry probe for transient measurement of water retention curves in structured soils", Engineering Geology, Oct. 2019, pp. 1-8.
(Continued)

*Primary Examiner* — Casey Bryant
(74) *Attorney, Agent, or Firm* — JCIPRNET

(57) ABSTRACT

The disclosure discloses a cone penetrometer for detecting multi-pollutants and the corresponding method based on laser induced fluorescence (LIF) and time domain reflectometry (TDR). The cone penetrometer includes two main modules: the TDR module mainly composes of a PEEK insulating rod, two gold-coated stainless steel probes and a coaxial cable; the LIF module mainly composes of endoscope image sensor, alumina glass lens, an ultraviolet LED with a 280 nm-wavelength, and an ultraviolet LED with a 325 nm-wavelength. Detection is performed to obtain the soil dielectric constant for characterizing the volumetric water content, electrical conductivity for the content of ionic pollutants, fluorescence intensity at 325 nm-wavelength for the content of polycyclic aromatic hydrocarbons, fluorescence intensity at 280 nm-wavelength for the content of (Continued)

humic acid, and soil images for soil types. The disclosure is easy to carry, able to quickly identify multi-pollutants, and is suitable for in-situ deep detection in solid waste landfill sites.

10 Claims, 5 Drawing Sheets

(51) Int. Cl.
    *G01N 21/33*     (2006.01)
    *G01N 21/64*     (2006.01)
    *G01N 27/22*     (2006.01)

(52) U.S. Cl.
    CPC ......... *G01N 21/645* (2013.01); *G01N 27/221* (2013.01); *G01N 2021/1753* (2013.01); *G01N 2021/1755* (2013.01); *G01N 2201/02* (2013.01); *G01N 2201/0612* (2013.01)

(56) References Cited

U.S. PATENT DOCUMENTS

2017/0003224 A1*   1/2017   Boss .................. G01N 21/8507
2019/0162663 A1*   5/2019   Zimbron ................ G01N 33/18

FOREIGN PATENT DOCUMENTS

| | | | |
|---|---|---|---|
| CN | 103116189 | 11/2015 | |
| CN | 109060755 | 12/2018 | |
| CN | 106706673 | 10/2019 | |
| CN | 111089852 | 5/2020 | |
| CN | 111965221 | 11/2020 | |
| CN | 111965221 A * | 11/2020 | ........... G01N 27/221 |
| TW | 200424552 | 11/2004 | |

OTHER PUBLICATIONS

Wesley McCall et al., "Evaluation and application of the optical image profiler (OIP) a direct push probe for photo-logging UV-induced fluorescence of petroleum hydrocarbons", Environmental Earth Sciences, May 2018, pp. 1-15.

"International Search Report (Form PCT/ISA/210) of PCT/CN2022/070021," mailed on Jul. 28, 2022, with English translation thereof, pp. 1-4.

"Written Opinion of the International Searching Authority (Form PCT/ISA/237) of PCT/CN2022/070021," mailed on Jul. 28, 2022, pp. 1-4.

* cited by examiner

CONE PENETROMETER AND METHOD FOR DETECTING MULTI-POLLUTANTS BASED ON TIME DOMAIN REFLECTOMETRY AND LASER INDUCED FLUORESCENCE

CROSS-REFERENCE TO RELATED APPLICATION

This application is a continuation of international application of PCT application serial no. PCT/CN2022/070021, filed on Jan. 4, 2022, which claims the priority benefit of China application no. 202111247746.9, filed on Oct. 26, 2021. The entirety of each of the above mentioned patent applications is hereby incorporated by reference herein and made a part of this specification.

TECHNICAL FIELD

The disclosure relates to a probe and a detection method in the technical field of in-situ detection of site pollution, in particular to a deep penetrating detection equipment and a penetrating detection method for detecting multiple pollutants in soils and groundwater based on laser induced fluorescence and time domain reflectometry.

BACKGROUND

There are over 20,000 landfills in China, including 27,000 simple landfills that were built without liners and over 1,800 sanitary landfills that were built with liners. Most of these landfills do not meet the requirements of current national standards, and they often cause three major environmental problems: namely landslide of the landfill, groundwater and soil pollution of the leachate seepage, and air pollution of the landfill gas. According to data from the China National Environmental Monitoring Center, serious leakage was found in 85% of the 345 sampled landfills. For example, in Beitiantang Landfill of Beijing, the groundwater and soil pollution is spread to a range of several square kilometers at a depth of 30 m. In addition to municipal solid waste landfills, groundwater and soil pollution is also widely found in landfills left over from industrial solid waste in China. A pollution survey of 81 industrial solid waste landfills in China shows that 34.9% of the survey sites were contaminated. These solid waste landfills are generally characterized in complex pollution problems such as high-concentration pollution source, deep ground pollution, coexistence of soil and groundwater pollution, and various types of pollutants. The types of pollutants including ionic pollutants (e.g., ammonia nitrogen, total phosphorus, chloride, and heavy metal ions), solved organic pollutants (e.g., chemical oxygen demand, humic acid), and polycyclic aromatic hydrocarbon (PAHs) pollutants (e.g., petroleum and some pesticides at industrial solid waste landfills). In view of the severe environmental problems caused by the above-mentioned solid waste landfills, there is still a lack of effective in-situ deep detection equipment and related technologies for detecting multiple pollutants on the site.

Time domain reflectometry (TDR) is a remote sensing test technology. The working principle thereof is that an electric pulse excited by a signal generator propagates along a coaxial cable in the form of electromagnetic waves. If the pulse encounters change of characteristic impedance inside the propagation medium, wave reflection will be generated. The signal processor records the reflected pulse signal. According to the propagation speed and the time interval between the transmitted pulse and the reflected pulse, it is possible to calculate the dielectric constant and electrical conductivity of the propagation medium. The dielectric constant may demonstrate the relative proportion of soil and groundwater (that is, the water content), the electrical conductivity may demonstrate the degree of soil contamination by ionic pollutants, and indirectly represent pollution indicators such as ammonia nitrogen, total phosphorus, chloride, and heavy metal content.

Currently laser induced fluorescence (LIF) detection technology is mainly used in in-situ testing of organic pollutants. When organic pollutants containing characteristic functional groups are excited by excitation light of a certain wavelength (such as ultraviolet light, visible light, etc.), the pollutants will emit fluorescence of various colors and different light intensities with wavelengths greater than that of the excitation light, and when the excitation light is extinguished, the fluorescence emitted by the pollutants also disappears quickly. Different organic pollutants (humic acid, polycyclic aromatic hydrocarbons, etc.) have different wavelengths of characteristic excitation light, they will also generate different types of fluorescence. By capturing and identifying fluorescence images, the type of pollutant may be determined, and the content of pollutants may be determined according to the color intensity of the fluorescence.

There are many domestic and international related in-situ detection equipment based on TDR technology to detect ionic pollutants. Time-domain reflective cone penetration device (TW92113188A) is a three-rod Time Domain Reflectometry (TDR) in-situ detection probe commonly used at present, which is suitable for electrical conductivity detection of ionic polluted soil. The in-situ TDR penetrometer (CN201310022293.9) used for the investigation of NAPLs polluted sandy soil adopts a four-rod probe to accomplish the detection of organic pollutants by TDR, but only qualitative identification can be achieved, and its function is partially limited in unsaturated soils. An environmental pore pressure static penetration probe (CN201710052441.X) for in-situ detection of heavy metal pollution in soil adopts a wound TDR sensor, which is more suitable for shallow soil at depth of 10 m due to the stiffness and sensitivity of the probe. To sum up, the TDR electrodes of the equipment mentioned above are large in size, which will inevitably disturb the soil during the detection process, resulting in variability of the detection results.

The tools such as ultra violet induced fluorescence photography (UVIF) cone penetrometer and ultra violet optical screening tool (UVOST) are the earliest in-situ detection probes based on LIF principle to detect light non-aqueous liquids (LNAPLs) in foreign countries (Hosseini et al., 2010). Optical image profiler (OIP) was further developed based on the LIF principle and could be used to realize detection of kerosene-like dense non-aqueous phase liquids (DNAPLs) by using green excitation light (McCall et al., 2018). A real-time in-situ detection device for soil pollution based on laser fluorescence induction technology (CN201811224897.0) is an existing probe detection product in China, but this disclosure does not clearly define the type and content of pollutants. The probe does not perform quantitative analysis on fluorescence signal, and there is a lack of diversity in target pollutants. There is currently no authorized in-situ detection probe with multiple excitation lights for multiple pollutants in landfill scenarios.

SUMMARY

In order to solve the problems existing in the related art, the present disclosure provides a detection probe for multiple pollutants as well as a detection method based on laser induced fluorescence and time-domain reflectometry.

The disclosure is suitable for in-situ deep detection in solid waste landfills such as municipal solid waste landfills, construction & demolition waste landfills, and industrial solid waste landfills. The disclosure is able to measure soil dielectric constant (indirectly characterizing volumetric water content), soil electrical conductivity (indirectly characterizing the content of ammonia nitrogen, total phosphorus, chloride, heavy metals and other ionic pollutants), fluorescence intensity $FI_{280}$ under excitation light at a wavelength of 280 nm (indirectly characterizing the content of polycyclic aromatic hydrocarbon pollutants), fluorescence intensity $FI_{325}$ under excitation light at a wavelength of 325 nm (indirectly characterizing the content of organic pollutants such as humic acid), thereby realizing the quantitative detection of multiple pollutants. Meanwhile, it is possible to obtain soil pictures to assist in identifying soil types.

The technical solution adopted by the present disclosure to solve the technical problem is:

1. A Cone Penetrometer for Detecting Multi-Pollutants Based on Laser Induced Fluorescence and Time Domain Reflectometry:

The probe includes a cone tip, a polyether ether ketone (PEEK) insulating rod, two gold-coated stainless steel probes, an endoscope image sensor, an alumina glass lens, an ultraviolet LED with a wavelength of 280 nm (280 nm UV light), a ultraviolet LED with an wavelength of 325 nm (325 nm UV light), a plane mirror and a stainless steel rod. The lower end of PEEK insulating rod is coaxially connected with the cone tip, and two gold-plated stainless steel probes are inlaid and fixed on the outer surface of the PEEK insulating rod. The upper end of the PEEK insulating rod is coaxially connected with the lower end of the stainless steel rod. The stainless steel rod is internally hollow and is drilled with a hole on the side wall. Alumina glass lens is inlaid in the drilled hole, and the stainless steel rod at the drilled hole is equipped with a laser induced fluorescence (LIF) module composed of an endoscope image sensor, a 280 nm UV light, a 325 nm UV light and a plane mirror. The endoscope image sensor, the 280 nm UV light, and the 325 nm UV light are all wired out.

The coaxial cable passes through the hollow interior of the PEEK insulating rod and is welded to the initial ends of the two gold-plated stainless steel probes. The endoscope image sensor, the 280 nm UV light, and the 325 nm UV light are all connected to a control cable. The control cable and coaxial cable are integrated into the bus cable in the stainless steel rod. The tail end of the bus cable passes through the upper end of the stainless steel rod, and is separated into the coaxial cable and control cable, which are then welded with the BNC connector and USB connector respectively.

Two gold-plated stainless steel probes are categorized into the outer peripheral probe and the inner peripheral probe, which are extended and arranged along the cylindrical surface conformed to the PEEK insulating rod. The outer peripheral probe and inner peripheral probe are both W-shaped/M-shaped, and the inflection points are U-shaped right-angle inflection points. The inner peripheral probe is formed by offsetting the outer peripheral probe inward for a fixed spacing distance. The outer peripheral probe and the inner peripheral probe are connected to the coaxial cable. The coaxial cable includes an inner wire, an insulating layer, a braided layer, and an outer sheath from an interior to an exterior in sequence. The inner wire is welded to the starting end of the inner peripheral probe through the copper wire, and the braided layer is welded to the starting end of the outer peripheral probe through the copper wire.

The endoscope image sensor has a light source. The outer surface of the alumina glass lens is a plane, and the inner surface is a concave surface. The 280 nm UV light and the 325 nm UV light are arranged on both sides of the plane mirror and are all facing the center of the plane mirror. The 280 nm/325 nm UV light emit light that enters the soil outside the stainless steel rod through the alumina glass lens to cause reflection and scattering. The fluorescence induced by UV light comes in from an exterior of the stainless steel rod passes through the alumina glass lens and is reflected by the plane mirror before entering the endoscope image sensor.

The endoscope image sensor includes an optical imaging chip and a circuit thereof, a lens, and a visible light LED illuminating lamp. The lens is arranged on the optical imaging chip and the circuit thereof. Eight visible light LED illuminating lamps are arranged around the lens.

Both the 280 nm UV light and the 325 nm UV light are formed by laminating an LED patch chip, a cooling plate and a circuit board.

2. A In-Situ Detecting Method for Multi-Pollutants Based on the Cone Penetrometer, and the Steps of the Method are as Follows:

Step 1. The BNC connector of the coaxial cable is connected to the signal transmitter, and the signal transmitter is connected to the computer; the USB connector of the control cable is directly connected to the computer.

Step 2. The crawler-mounted static penetration machine is adopted to penetrate the cone penetrometer to the to-be detected position in the polluted site to start detection. For each detection, the emission of electromagnetic wave signal is first generated according to commands from the computer, and the signal is transmitted along the coaxial cable to the gold-plated stainless steel probes. The computer displays the reflection signal induced by the change of the medium impedance during the propagation of the electromagnetic wave, and calculates the soil dielectric constant and soil electrical conductivity $EC_{soil}$ at the detected position.

Step 3. The 280 nm UV light and the 325 nm UV light are both in the off state, and then the computer is controlled to use the endoscope image sensor to take pictures of the soil under the irradiation of visible light LED illuminating lamp. Then the visible light LED illuminating lamp is turned off, and the 325 nm UV light is kept off, and the 280 nm UV light is turned on, pictures of the soil under 280 nm UV light excitation are taken. Next, the visible light LED illuminating lamp is kept off, the 280 nm UV light is turned off, and the 325 nm UV light is turned on, pictures of the soil under 325 nm UV light excitation are taken.

Step 4. After the cone penetrometer for multi-pollutants has completely entered the ground subsurface, the detection is started. The second and third step should be repeated once every time the cone penetrometer moves down an interval depth until the cone penetrometer has penetrated to the position with the maximum depth. After the last test is completed, the cone penetrometer should be pulled out.

Step 5. A soil electrical conductivity profile curve is illustrated based on the soil electrical conductivity test result. A soil water content profile curve is illustrated based on the soil dielectric constant test result. Based on the HSV color model, the soil picture taken under the excitation of 280 nm UV light is analyzed, and the fluorescence intensity $FI_{280}$ under the excitation of 280 nm UV light is obtained, thereby the profile content of polycyclic aromatic hydrocarbon pollutants can be obtained. Based on the HSV color model, the soil picture taken under the excitation of 325 nm UV light is analyzed, and the fluorescence intensity $FI_{325}$ under the excitation of 325 nm UV light is obtained, thereby the profile content of humic acid pollutants can be obtained. Soil pictures taken at different depths are obtained and compared with the standard sample pictures of different types of soil to assist in identifying the soil type. The detected soil electrical conductivity $EC_{soil}$ is substituted into the following formula to calculate the content of soil ionic pollutants:

$$EC_{soil} = a \cdot c_{ionic} + EC_{surface}$$

In the formula, $EC_{soil}$ is the soil electrical conductivity, $EC_{surface}$ is the soil surface electrical conductivity, $c_{ionic}$ is the content of ionic pollutants, and a is a calculation parameter.

The detected fluorescence intensity $FI_{325}$ under the excitation of 325 nm UV light is substituted into the following formula to calculate the soil humic acid content:

$$FI_{325} = b \cdot c_{humic} + d$$

In the formula, $FI_{325}$ is the fluorescence intensity under the excitation of 325 nm UV light, $c_{humic}$ is the content of humic acid, and b and d are calculation parameters.

The detected fluorescence intensity $FI_{280}$ under the excitation of 280 nm UV light is substituted into the following formula to calculate the content of polycyclic aromatic hydrocarbons in soil:

$$FI_{280} = e \cdot c_{PAHs} + f$$

In the formula, $FI_{280}$ is the fluorescence intensity under the excitation of 280 nm UV light, $c_{PAHs}$ is the content of polycyclic aromatic hydrocarbons, and e and f are calculation parameters.

The present disclosure establishes the relationship between various signals and various soil pollutants by processing the detected signals above, thereby accurately determining soil pollutant content, especially achieves a breakthrough in obtaining soil humic acid content through fluorescence intensity.

The applicable scenarios of the present disclosure include, but are not limited to, polluted sites where multi-pollutants exist, including municipal solid waste landfills, construction and demolition waste landfills, and industrial solid waste landfills.

By adopting the TDR detection module (including PEEK insulating rod, gold-plated stainless steel probes, coaxial cable), the present disclosure is able to obtain soil dielectric constant, electrical conductivity and other indicators to characterize the content of ionic pollutants. Through the LIF detection module (including endoscope image sensor, alumina glass lens, 280 nm UV light, 325 nm UV light, plane mirror, control cable), it is possible to obtain indicators such as fluorescence intensity at a wavelength of 325 nm, fluorescence intensity at a wavelength of 280 nm etc., and soil pictures, characterizing contents of pollutant such as humic acid, polycyclic aromatic hydrocarbons and soil type.

The disclosure is easy to carry, able to quickly obtain content of multi-pollutants, and is suitable for in-situ deep detection in scenes such as solid waste landfill sites.

The advantageous effects of the present disclosure are as follows:

In addition to being applicable to in-situ deep detection of solid waste landfills such as municipal solid waste landfills, construction and demolition waste landfills, and industrial solid waste landfills, the present disclosure may also be applied to pollution detection at other sites such as oil spills and illegal emissions from factories, and even pollution detection in the field of marine geotechnical engineering and crude oil detection project.

The cone penetrometer of the present disclosure is easy to carry and able to perform detection in combination with a TDR200 signal generator and a computer, and the tool has low requirements even under poor working conditions. The single detection cycle is short, and a detection at a depth of 30 m may be completed within 1 hour, which considerably improves the efficiency of pollution detection. The provided detection data is comprehensive, not only including the electrical conductivity that comprehensively reflects the content of ionic pollutants, but also the fluorescence intensity under the excitation of 325 nm UV light that reflects the content of organic pollutants such as humic acid, and the fluorescence intensity under the excitation of 280 nm UV light that reflect the content of polycyclic aromatic hydrocarbons such as petroleum and pesticides. The pictures under irradiation of visible light and dielectric constant of the soil may assist in the identification of the soil type and water content, and achieve a comprehensive judgment on the basic characteristics and pollution of the soil.

Compared with conventional laboratory detection methods, the present disclosure avoids tedious preparatory work such as sampling and sample preparation, and obtains multiple pollution indicators quickly and synchronously. Compared with the conventional detection where different indicators need to be determined according to different experiments, the detection efficiency of the present disclosure is significantly improved, and the disclosure belongs to in-situ detection equipment, which avoids data distortion caused by soil disturbance and time variability caused by off-site detection. The present disclosure is able to undertake the detection work in harsh natural environments such as high temperature, high pressure, strong acid and strong alkali.

Compared with the coil-wound type, probe-, and plate-type TDR detection module, the present disclosure reduces the space occupied by the TDR probe by means of bending and curving, minimizing the disturbance of the target soil by the device during the detection process, and avoids the test data distortion. Compared with similar technical equipment UVIF and UVOST, the present disclosure adopts three kinds of excitation light with a wavelength of 280 nm, 325 nm and visible light, and is also able to infinitely expand the range of detectable spectral wavelengths by replacing the excitation light source, thus realizing multi-pollutants detection, and significantly extending the functionality. Since the method of the present disclosure contains taking pictures of soil to assist in the identification of soil types, compared with single-light path detection equipment such as UVIF and UVOST, the detection reliability is significantly improved. Compared with OIP (only suitable for detecting polycyclic aromatic hydrocarbons), the present disclosure expands the application and achieves a development in a new application field in municipal solid waste landfills.

The disclosure fills up the relevant gaps in detecting the soil pollution of municipal solid waste landfills, and proposes a novel in-situ deep penetration detection equipment based on the principle of laser induced fluorescence and time-domain reflectometry. The breakthrough in the field is an important progress in the development of environmental protection industry.

Figure 1:
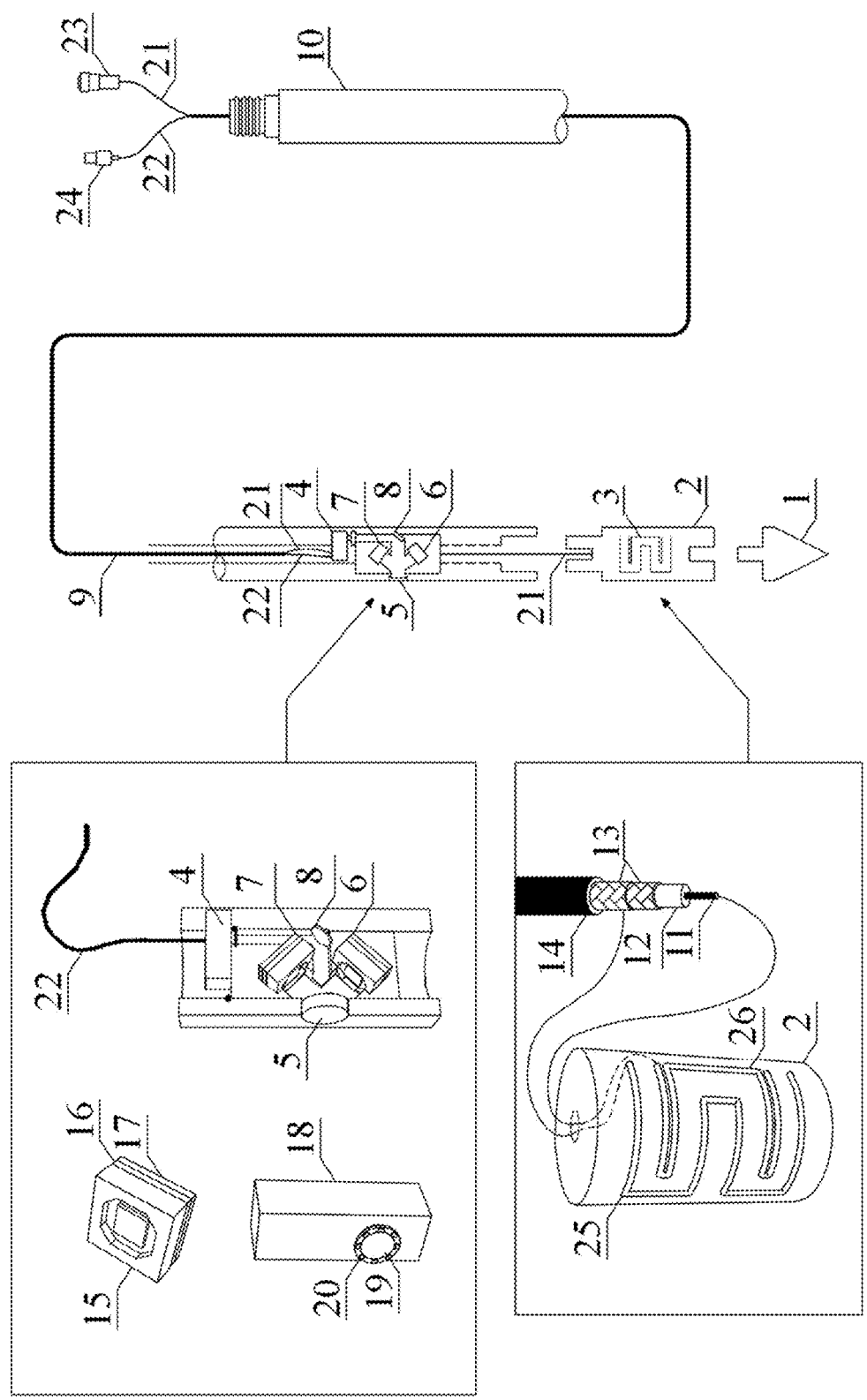
FIG. 1 is a structural diagram of the device of the present disclosure.

Cone tip 1, PEEK insulating rod 2, gold-plated stainless steel probe 3, endoscope image sensor 4, alumina glass lens 5, 280 nm UV light 6, 325 nm UV light 7, plane mirror 8, bus cable 9, stainless steel rod 10, inner probe 11, insulating layer 12, braided layer 13, outer sheath 14, LED SMD (surface mount device) chip 15, heat-dissipating plate 16, circuit board 17, optical imaging chip and circuit thereof 18, lens 19, visible light LED illuminating lamp 20, coaxial cable 21, control cable 22, BNC connector 23, USB connector 24, outer peripheral probe 25, inner peripheral probe 26.

DESCRIPTION OF THE EMBODIMENTS

The present disclosure will be further described below in conjunction with the accompanying drawings and embodiments.

As shown in FIG. 1, the cone penetrometer includes a cone tip 1, a PEEK insulating rod 2, a gold-plated stainless steel probe 3, an endoscope image sensor 4, an alumina glass lens 5, a 280 nm UV light 6, a 325 nm UV light 7, a plane mirror 8 and a stainless steel rod 10.

The lower end of the PEEK insulating rod 2 is coaxially connected with the cone tip 1 through threads, and two gold-plated stainless steel probes 3 are inlaid and fixed on the outer surface of the PEEK insulating rod 2.

The upper end of the PEEK insulating rod 2 is coaxially connected with the lower end of the stainless steel rod 10 through threads, and the stainless steel rod 10 is internally hollow and is drilled with a hole on the side wall. Alumina glass lens 5 is inlaid in the drilled hole, and the stainless steel rod 10 at the drilled hole is equipped with a laser induced fluorescence module composed of an endoscope image sensor 4, a 280 nm UV light 6, a 325 nm UV light 7 and a plane mirror 8. The endoscope image sensor 4, the 280 nm UV light 6, and the 325 nm UV light 7 are all wired out.

The coaxial cable 21 passes through the hollow interior of the PEEK insulating rod 2 and is welded to the initial ends of the two gold-plated stainless steel probes 3. The endoscope image sensor 4, the 280 nm UV light 6, the 325 nm UV light 7 are all connected to the control cable 22. The control cable 22 and coaxial cable 21 are integrated into the bus cable 9 in the stainless steel rod 10. The tail end of the bus cable 9 passes through the upper end of the stainless steel rod 10, and is separated into the coaxial cable 21 and control cable 22, which are then welded with the BNC connector 23 and USB connector 24 respectively.

Two gold-plated stainless steel probes 3 are categorized into the outer peripheral probe 25 and the inner peripheral probe 26, which are extended and arranged along the cylindrical surface conformed to the PEEK insulating rod 2. The outer peripheral probe 25 and inner peripheral probe 26 are both W-shaped/M-shaped, and the inflection points of the outer peripheral probe 25 and the inner peripheral probe 26 are U-shaped right-angle inflection points, that is, the inflection point is formed by three consecutive folded edges, and the adjacent two folded edges are arranged vertically. The inner peripheral probe 26 is formed by offsetting the outer peripheral probe 25 inwardly by a fixed distance.

As shown in FIG. 1, the outer peripheral probe 25 is bent at 90° for the first time after extending horizontally along the curved surface for 40 mm, and then bent at 90° for the second time after extending vertically for 23 mm. The extending direction after bending is opposite to the initial extending direction, and the 90° bending occurs for the third time after extending for 30 mm. The extending direction after bending is the same as the extending direction after the first bending, and the 90° bending occurs for the fourth time after extending for 12 mm. The extending direction after bending is opposite to the initial extending direction, and the 90° bending occurs for the fifth time after extending for 30 mm. The extending direction after bending is the same as the extending direction after the first bending, and the 90° bending occurs for the sixth time after extending for 23 mm. The extending direction after bending is opposite to the initial extending direction, and extending for 40 mm to the terminal end of the outer peripheral probe 25.

In specific implementation, the diameters of the outer peripheral probe 25 and the inner peripheral probe 26 are 1 mm, and the inward offset distance of the inner peripheral probe 26 relative to the outer peripheral probe 25 is 10 mm. In this manner, the trajectory of the inner peripheral probe 26 is always correspondingly parallel to the trajectory of the outer peripheral probe 25 while keeping 10 mm from each other.

In the related art, multiple straight probes are arranged downwards, or the probes are wound, but the present disclosure adopts two probes such as inner and outer W-shaped/M-shaped probes, which not only significantly reduces the space occupied by the probes through bending, but also reduces the chance of disturbing the surrounding soil, thereby eliminating the extrusion effect, and avoiding data distortion during the test.

Both the outer peripheral probe 25 and the inner peripheral probe 26 are connected to the coaxial cable 21. The coaxial cable 21 includes an inner wire 11, an insulating layer 12, a braided layer 13, and an outer sheath 14 from an interior to an exterior in sequence. The inner probe 11 is welded to the starting end of the inner peripheral probe 26 through the copper wire, and the braided layer 13 is welded to the starting end of the outer peripheral probe 25 through the copper wire.

The endoscope image sensor 4 has a light source, the outer surface of the alumina glass lens 5 is a plane, and the inner surface thereof is a concave surface. The 280 nm UV light 6 and the 325 nm UV light 7 are arranged on both sides of the plane mirror 8 towards the center of the plane mirror 8. The extension lines of the light paths for the 280 nm UV light 6, the extension lines of the light paths for the 325 nm UV light 7, and the center point-to-center point line of the plane mirror 8 and the alumina glass lens 5 intersect at the center point of the alumina glass lens 5. The 280 nm UV light 6 and the 325 nm UV light 7 emit light that enters the soil outside the stainless steel rod 10 through the alumina glass lens 5 to cause reflection and scattering. The 280 nm UV light 6 and the 325 nm UV light 7 emit light that enters the soil outside the stainless steel rod 10 through the alumina glass lens 5 to cause reflection and scattering. The fluorescence induced by UV light comes in from an exterior of the stainless steel rod 10 passes through the alumina glass lens 5 and is reflected by the plane mirror 8 before entering the endoscope image sensor 4.

The mirror surface of the plane mirror 8 is 45° to the mirror surface of the alumina glass lens 5. The lens surface of the endoscope image sensor 4 is 45° to the mirror surface of the plane mirror 8. The plane mirror 8 transmits the image on the outer surface of the alumina glass lens 5 to the endoscope image sensor 4 through light reflection. The extension line of the light path for the 280 nm UV light 6 forms a 45° angle with the line connecting the center point of the plane mirror 8 and the center point of the alumina glass lens 5. Similarly, the extension line of the light path for the 325 nm UV light 7 forms a 45° angle with the line connecting the center point of the plane mirror 8 and the center point of the alumina glass lens 5.

In specific implementation, the center point of the plane mirror 8 is 30 mm away from the center point of the alumina glass lens 5, and the center point of the lens of the endoscope image sensor 4 is 34 mm away from the center point of the plane mirror 8.

The endoscope image sensor 4 includes an optical imaging chip and a circuit 18 thereof, a lens 19, and a visible light LED illuminating lamp 20. The lens 19 is arranged on the optical imaging chip and the circuit 18 thereof. Eight visible light LED illuminating lamps 20 are arranged around the lens 19.

In specific implementation, the endoscope image sensor 6 has a length of 23 mm, a width of 7 mm, a total thickness of the lens 19 is 16 mm, a resolution is 1280×720, an imaging distance is 10-50 mm with an adjustable focal length, and an operating voltage is 5V.

The 280 nm UV light 6 and the 325 nm UV light 7 are both formed by laminating the LED SMD (surface mount device) chip 15, the heat-dissipating plate 16, and the circuit board 17, with a size of 20×20×10 mm, a power of 5-10 mW, and a divergence angle of 60°.

The 280 nm UV light 6 has a wavelength range of 275-285 nm, with a central wavelength of 280 nm; the 325 nm UV light 7 has a wavelength range of 320-330 nm, with a central wavelength of 325 nm.

Figure 2:
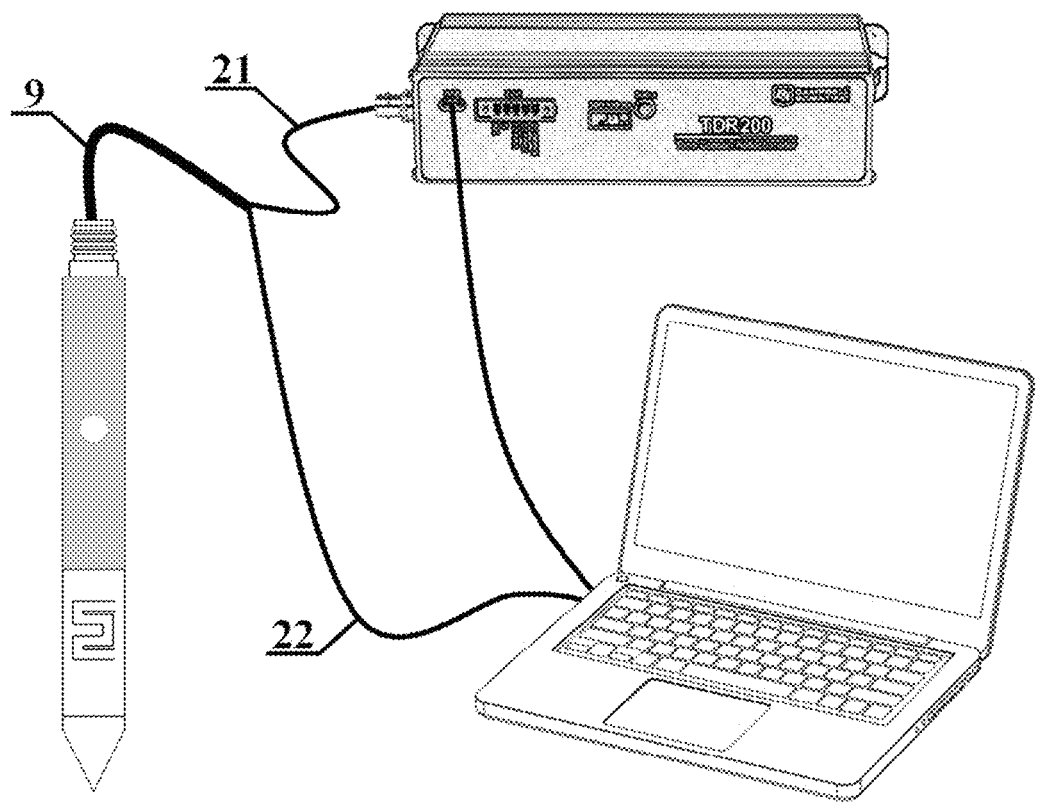
FIG. 2 is a schematic diagram of an overall connection mode of the system of the present disclosure.

The specific implementation process of the present disclosure can be operated according to the following steps:

Step 1. As shown in FIG. 2, the BNC connector 23 of the coaxial cable 21 is connected to the TDR200 signal transmitter, and the TDR200 signal transmitter is connected to the computer; the USB connector 24 of the control cable 22 is directly connected to the computer.

Step 2. The crawler-mounted static penetration machine is adopted to penetrate the cone penetrometer to the to-be detected position in the polluted site to start detection. For each detection, TDR200 is first controlled by the computer to generate the electromagnetic wave signal, and the signal is transmitted along the coaxial cable 21 to the gold-plated stainless steel probes 3. The computer displays the reflection signal generated by the change of the medium impedance during the propagation of the electromagnetic wave, and calculates the soil dielectric constant and soil electrical conductivity $EC_{soil}$ at the detected position.

Step 3. The 280 nm UV light 6 and the 325 nm UV light 7 are both in the off state, and then the computer is controlled to use the endoscope image sensor 4 to take pictures of the soil under the irradiation of visible light LED illuminating lamp 20. Then the visible light LED illuminating lamp 20 is turned off, the 325 nm UV light 7 is kept off, and the 280 nm UV light 6 is turned on, pictures of the soil under 280 nm UV light excitation are taken. Next, the visible light LED illuminating lamp 20 is kept off, the 280 nm UV light 6 is turned off, and the 325 nm UV light 7 is turned on, pictures of the soil under 325 nm UV light excitation are taken.

Step 4. After the cone penetrometer for multi-pollutants has completely entered the ground subsurface, the detection is started. The second and third step should be repeated once every time the cone penetrometer moves down an interval depth until the cone penetrometer has penetrated to the position with the maximum depth. After the last test is completed, the cone penetrometer should be pulled out.

Step 5. A soil electrical conductivity profile curve is illustrated based on the soil electrical conductivity test result. A soil water content profile curve is illustrated based on the soil dielectric constant test result. Based on the HSV color model, the soil picture taken under the excitation of 280 nm UV light 6 is analyzed, and the fluorescence intensity $FI_{280}$ under the excitation of 280 nm UV light 6 is obtained, thereby the profile content of polycyclic aromatic hydrocarbon pollutants can be obtained. Based on the HSV color model, the soil picture taken under the excitation of 325 nm UV light 7 is analyzed, and the fluorescence intensity $FI_{325}$ under the excitation light of 325 nm UV light 7 is obtained, thereby the profile content of humic acid pollutants can be obtained. Soil pictures taken at different depths are obtained and compared with the standard sample pictures of different types of soil to assist in identifying the soil type. The detected soil electrical conductivity $EC_{soil}$ is substituted into the following formula to calculate the content of soil ionic pollutants:

$$EC_{soil} = a \cdot c_{ionic} + EC_{surface}$$

In the formula, $EC_{soil}$ is the soil electrical conductivity, $EC_{surface}$ is the soil surface electrical conductivity, $c_{ionic}$ is the content of ionic pollutants, and a is a calculation parameter.

The detected fluorescence intensity $FI_{325}$ under the excitation of 325 nm UV light 7 is substituted into the following formula to calculate the soil humic acid content:

$$FI_{325} = b \cdot c_{humic} + d$$

In the formula, $FI_{325}$ is the fluorescence intensity under the excitation of 325 nm UV light 7, $c_{humic}$ is the content of humic acid, and b and d are calculation parameters.

The detected fluorescence intensity $FI_{280}$ under the excitation of 280 nm UV light is substituted into the following formula to calculate the content of polycyclic aromatic hydrocarbons in soil:

$$FI_{280} = e \cdot c_{PAHs} + f$$

In the formula, $FI_{280}$ is the fluorescence intensity under the excitation of 280 nm UV light 6, $c_{PAHs}$ is the content of polycyclic aromatic hydrocarbons, and e and f are calculation parameters.

The use of the present disclosure is described in detail below in conjunction with the embodiment of a certain landfill.

First, as shown in FIG. 2, the BNC connector is connected to the TDR200 signal transmitter, and the TDR200 signal transmitter is connected to the computer; the USB connector is directly connected to the computer.

Figure 3:
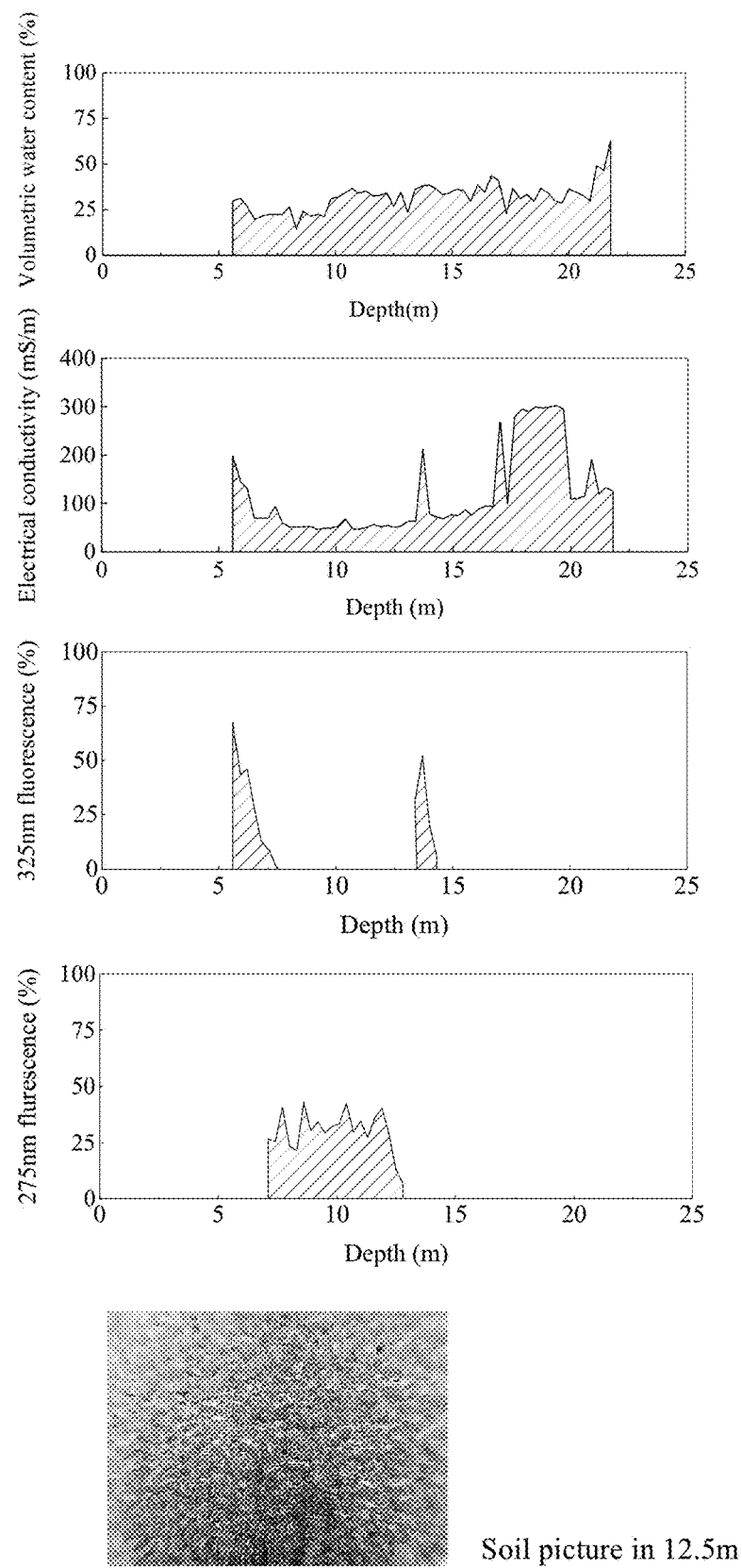
FIG. 3 is an original detection data obtained by the present disclosure in a typical application scenario of a solid waste landfill.

Then, the crawler-mounted static penetration machine carries the tool of the present disclosure to the target site, and the penetration detection is started. Since the surface of the site is a gravel layer and cement floor, the test starts when the cone penetrometer penetrates to a depth of 5.6 m into the underground soil layer. In each detection, the TDR200 is first controlled by the computer to generate electromagnetic wave signals. The signal is transmitted to the gold-plated stainless steel probe along the coaxial cable, and the computer displays the reflection signal generated by the change of the dielectric impedance during the propagation of the electromagnetic wave. The soil dielectric constant (characterizing the volumetric water content) and electrical conductivity at the detection location are calculated and obtained as shown in the volumetric water content and electrical conductivity data in FIG. 3. Under the circumstances, both the 280 nm UV light and the 325 nm UV light are turned off. First, the computer controls the endoscope image sensor to take pictures of the soil under the irradiation of visible light LED illuminating lamp to assist in identifying the soil type. The soil picture in FIG. 3 is the soil picture at the depth of 12.5 m. Then, the visible light LED illuminating lamp is turned off, the 325 nm UV light is kept off, the UV LED at a wavelength of 280 nm is turned on, and pictures of the soil are taken under the condition. Then fluorescence analysis is performed on the soil picture, and the fluorescence color is extracted based on the HSV color model to obtain the relative fluorescence intensity, as shown in 280 nm fluorescence in FIG. 3, thereby assisting in identifying the type and content of PAHs. The visible light LED illuminating lamp is kept off, the 280 nm UV light is turned off, the 325 nm UV light is turn on, and pictures of the soil are taken under the condition. Then fluorescence analysis is performed on the soil picture, and the fluorescence color is extracted based on the HSV color model to obtain the relative fluorescence intensity, as shown in 325 nm fluorescence in FIG. 3, thus assisting in identifying the humic acid content inside the leachate. At this stage, all tests at this position are completed.

Each time, advance by 300 mm and the above test steps are repeated until the cone penetrometer of the present disclosure reaches a depth of 21.8 m, and after the last test is completed, the crawler-mounted static penetration machine is controlled to pull out the cone penetrometer of the present disclosure.

According to the analysis of the data results, the volumetric water content of the soil at different depths may be obtained according to the volumetric water content in FIG. 3, for example, the volumetric water content at the depth of 10.4 m is 34%.

Figure 4:
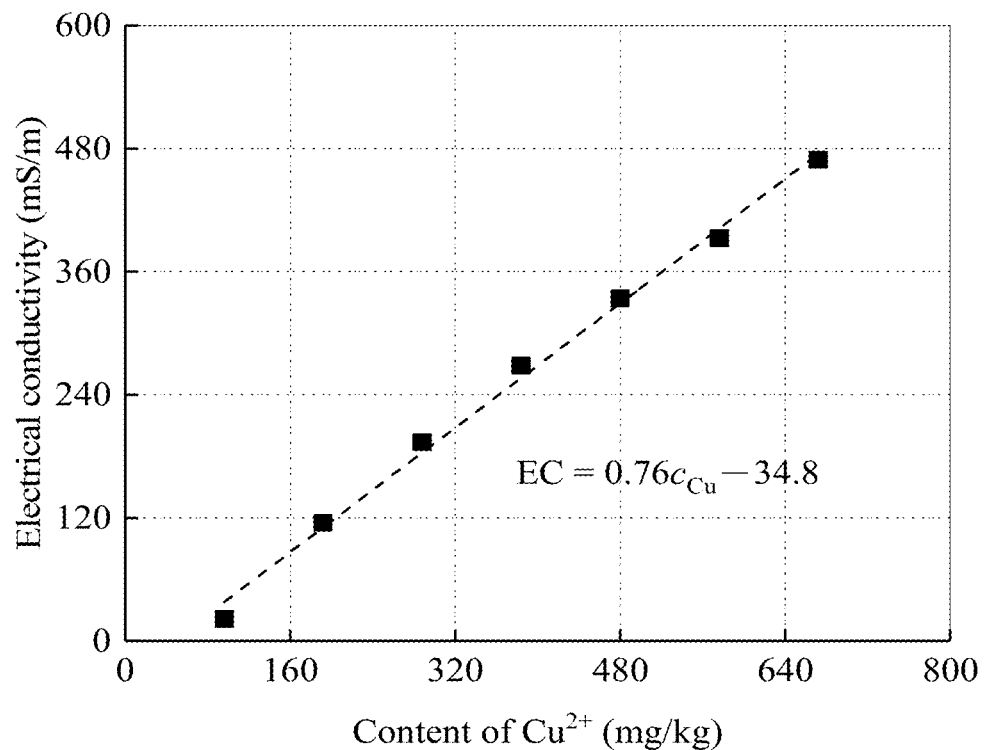
FIG. 4 is a correlation chart showing comparison between electric conductivity and heavy metal $Cu^{2+}$ content that the present disclosure detects.

According to the electrical conductivity in FIG. 3, if the site is polluted by heavy metal copper, the copper ion content at different depths may be determined by referring to FIG. 4, for example, the electrical conductivity is 212.1 mS/m at a depth of 13.7 m, and the content of $Cu^{2+}$ is about 324.9 mg/kg.

Figure 5:
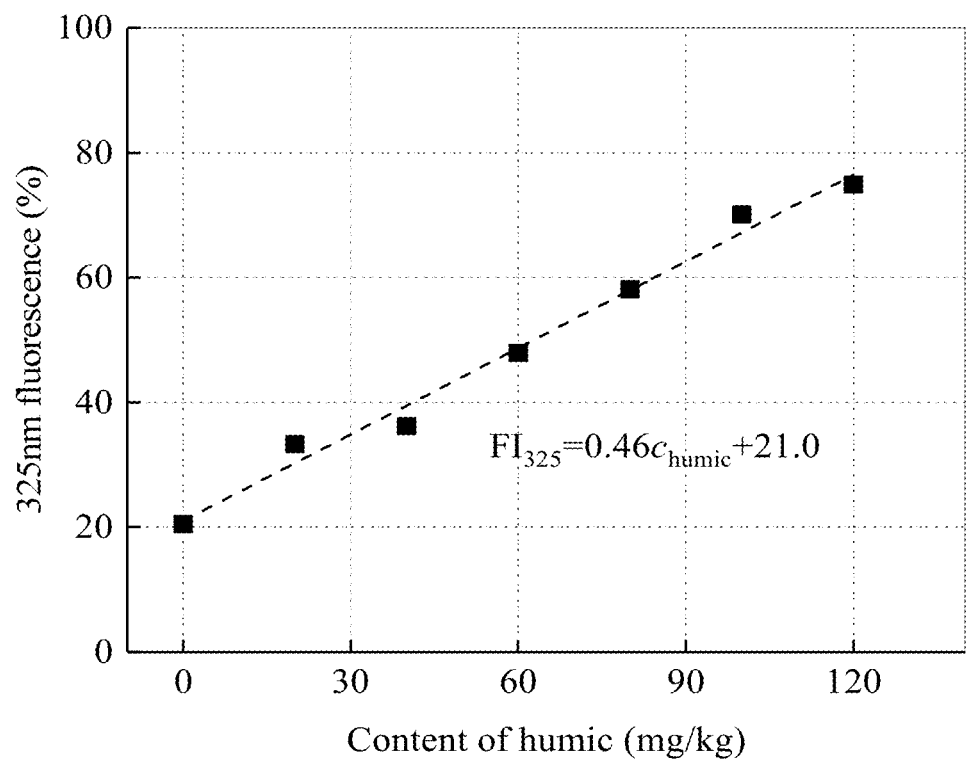
FIG. 5 is a correlation chart showing comparison between the fluorescence intensity under the excitation of 325 nm UV light and humic acid content detected by the present disclosure.

According to 325 nm fluorescence intensity in FIG. 3, the content of humic acid at different depths may be determined by referring to FIG. 5, for example, the relative fluorescence intensity at a wavelength of 325 nm is 67.4% at a depth of 5.6 m, and the content of humic acid is about 100.9 mg/kg.

Figure 6:
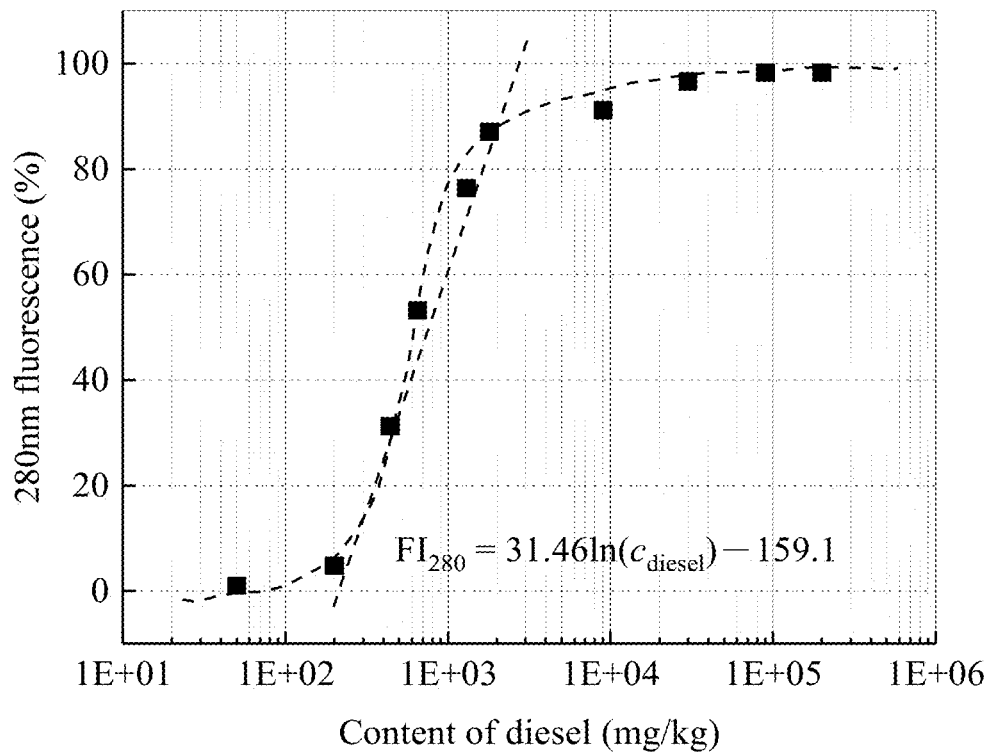
FIG. 6 is a correlation chart showing comparison between the fluorescence intensity under the excitation of 280 nm UV light and the diesel oil content detected by the present disclosure.

According to 280 nm fluorescence intensity in FIG. 3, if the site is a diesel polluted site, the diesel content at different depths may be determined by referring to FIG. 6, for example, the fluorescence intensity at a wavelength of 280 nm is 43% at a depth of 8.6 m, and the diesel content is about 616.5 mg/kg.

Referring to the soil picture in FIG. 3, for example, the soil picture at a depth of 12.5 m in the figure is compared with the picture of the medium-sand standard sample, it may be considered that the soil layer at this position is a medium-sand layer.

Figure 7:
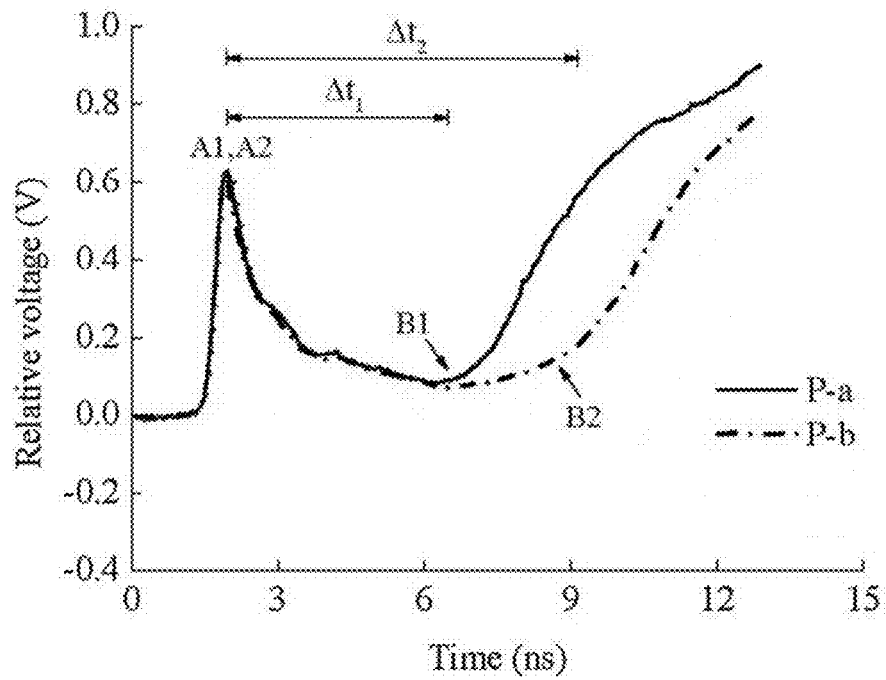
FIG. 7 is a comparison diagram showing comparison between the TDR waveform measured by the present disclosure and the TDR waveform measured by the other existing equipment.

FIG. 7 shows the TDR waveform (P-b) measured by the present disclosure and the TDR waveform (P-a) measured by conventional equipment. It may be learned that since the probes in the related art are arranged in the configurations of multiple straight probes facing downwards or the coiled probes, while the present disclosure proposes two probes such as outer and inner probes of W-shape/M-shape, so it is possible to significantly reduce the space occupied by probes by bending. The value $\Delta t_2$ measured by the waveform is significantly greater than the value $\Delta t_1$ measured by the conventional equipment, which increases the sensitivity of the probe to the surrounding soil, reduces the disturbance to the surrounding soil, and avoids the data distortion during the test process.

In summary, by using the present disclosure to conduct an in-situ test on a site position, it is possible to obtain the soil dielectric constant, electrical conductivity, fluorescence intensity under the excitation of ultraviolet light at a wavelength of 280 nm, fluorescence intensity under the excitation of ultraviolet light at a wavelength of 325 nm, and soil pictures, thereby realizing the characterization of the volumetric water content, ionic pollutant content, polycyclic aromatic hydrocarbon content, humic acid content, and soil type at the corresponding location, thus realizing the identification of multi-pollutants.

What is claimed is:

1. A cone penetrometer for detecting multi-pollutants based on laser induced fluorescence and time domain reflectometry, characterized in that: a cone tip (1), a polyether ether ketone (PEEK) insulating rod (2), two gold-coated stainless steel probes (3), an endoscope image sensor (4), an alumina glass lens (5), an ultraviolet LED with a wavelength of 280 nm (280 nm UV light) (6), an ultraviolet LED with a wavelength of 325 nm (325 nm UV light) (7), a plane mirror (8) and a stainless steel rod (10); wherein a lower end of the PEEK insulating rod (2) is coaxially connected with the cone tip (1), and two gold-coated stainless steel probes (3) are inlaid and fixed on the outer surface of the PEEK insulating rod (2); the upper end of the PEEK insulating rod (2) is coaxially connected with a lower end of the stainless steel rod (10), and the stainless steel rod (10) is internally hollow and is drilled with a hole on a side wall thereof, the alumina glass lens (5) is inlaid in the drilled hole, and the stainless steel rod (10) at the drilled hole is internally equipped with a laser induced fluorescence (LIF) module composed of the endoscope image sensor (4), the 280 nm UV LED (6), the 325 nm UV LED (7) and the plane mirror (8), the endoscope image sensor (4), the 280 nm UV light (6), and the 325 nm UV light (7) are all wired out.

2. The cone penetrometer for detecting multi-pollutants based on laser induced fluorescence and time domain reflectometry according to claim 1, characterized in that an interior of the PEEK insulating rod (2) is hollow, and a coaxial cable (21) passes through the hollow interior of the PEEK insulating rod (2), and then is welded to the starting end of the two gold-coated stainless steel probes (3); the endoscope image sensor (4), the 280 nm UV light (6), the 325 nm UV light (7) are all connected to a control cable (22), the control cable (22) and the coaxial cable (21) are integrated into a bus cable (9) in the stainless steel rod (10); a tail end of the bus cable (9) passes through the upper end of the stainless steel rod (10), and is separated into the coaxial cable (21) and the control cable (22), which are then welded with a BNC connector (23) and a USB connector (24) respectively.

3. The cone penetrometer for detecting multi-pollutants based on laser induced fluorescence and time domain reflectometry according to claim 1, characterized in that the two gold-coated stainless steel probes (3) are categorized into an outer peripheral probe (25) and an inner peripheral probe (26), which are extended and arranged along a cylindrical surface conformed to the PEEK insulating rod (2); the outer peripheral probe (25) and the inner peripheral probe (26) are both W-shaped/M-shaped, and inflection points of the outer peripheral probe (25) and the inner peripheral probe (26) are U-shaped right-angle inflection points; the inner peripheral probe (26) is formed by offsetting the outer peripheral probe (25) inwardly by a fixed spacing distance; both the outer peripheral probe (25) and the inner peripheral probe (26) are connected to the coaxial cable (21), the coaxial cable (21) includes an inner wire (11), an insulating layer (12), a braided layer (13), and an outer sheath (14) from an interior to an exterior in sequence, the inner wire (11) is welded to a starting end of the inner peripheral probe (26) through a copper wire, and the braided layer (13) is welded to a starting end of the outer peripheral probe (25) through another copper wire.

4. The cone penetrometer for detecting multi-pollutants based on laser induced fluorescence and time domain reflectometry according to claim 1, characterized in that the endoscope image sensor (4) has a light source, an outer surface of the alumina glass lens (5) is a plane, and an inner surface of the alumina glass lens is a concave surface; the 280 nm UV light (6) and the 325 nm UV light (7) are arranged on both sides of the plane mirror (8) and facing towards the center of the plane mirror (8); the 280 nm UV light (6) or 325 nm UV light (7) emits light that enters the soil outside the stainless steel rod (10) through the alumina glass lens (5) to cause reflection and scattering; the fluorescence induced by UV light comes in from an exterior of the stainless steel rod (10) passes through the alumina glass lens (5) and is reflected by the plane mirror (8) before entering the endoscope image sensor (4).

5. The cone penetrometer for detecting multi-pollutants based on laser induced fluorescence and time domain reflectometry according to claim 4, characterized in that the endoscope image sensor (4) comprises an optical imaging chip and a circuit (18) thereof, a lens (19), and a visible light LED illuminating lamp (20); the lens (19) is arranged on the optical imaging chip and the circuit (18) thereof; the quantity of the visible light LED illuminating lamps (20) is eight and the eight visible light LED illuminating lamps (20) are arranged around the lens (19).

6. The cone penetrometer for detecting multi-pollutants based on laser induced fluorescence and time domain reflectometry according to claim 1, characterized in that the 280 nm UV light (6) and the 325 nm UV light (7) are both formed by laminating a LED SMD (surface mount device) chip (15), a heat-dissipating plate (16), and a circuit board (17).

7. A in-situ detecting method for multi-pollutants based on the cone penetrometer according to claim 1, characterized by following steps:
step 1. connecting the BNC connector (23) of the coaxial cable (21) to a signal transmitter, and connecting the signal generator to a computer;
directly connecting the USB connector (24) of the control cable (22) to the computer;
step 2. adopting a crawler-mounted static penetration machine to penetrate the cone penetrometer to a to-be detected position of a polluted site to start detection,
for each detection, generating an electromagnetic wave signal firstly by the computer,
transmitting the signal to the two gold-coated stainless steel probes (3) along the coaxial cable (21),
displaying the reflection signal induced by a change of a medium impedance during propagation of the electromagnetic wave, and calculating a soil dielectric constant and a soil electrical conductivity $EC_{soil}$ at the detected position by the computer;
step 3. the 280 nm UV light (6) and the 325 nm UV light (7) being both in an off state, and then the computer controlling the endoscope image sensor (4) to take pictures of the soil under irradiation of the visible light LED illuminating lamp (20);
taking pictures of the soil while the visible light LED illuminating lamp (20) being turned off, the 325 nm UV LED (7) being kept off, and the 280 nm UV light (6) being turned on;
taking pictures of the soil while the visible light LED illuminating lamp (20) being kept off, the 280 nm UV light (6) being turned off, and the 325 nm UV LED (7) being turned on;
step 4. after the cone penetrometer for multi-pollutants has completely entered the ground subsurface, starting the detection, wherein the second step and third step are repeated once every time the cone penetrometer moves down an interval depth until the cone penetrometer has penetrated to a position with a maximum depth,
after the last test is completed, pulling out the cone penetrometer;
step 5. illustrating a soil electrical conductivity profile curve based on a soil electrical conductivity test result;
illustrating a soil water content profile curve based on a soil dielectric constant test result;
based on a HSV color model, a soil picture taken under an excitation of the 280 nm UV light (6) being analyzed, and a fluorescence intensity $FI_{280}$ under the excitation of 280 nm UV light being obtained, thereby obtaining a profile content of polycyclic aromatic hydrocarbon pollutants;

based on the HSV color model, a soil picture taken under an excitation of the 325 nm UV light (7) being analyzed, and a fluorescence intensity $FI_{325}$ under the excitation of 325 nm UV light being obtained, thereby obtaining a profile content of humic acid pollutants;

soil pictures taken at different depths being obtained to assist in identifying soil types.

8. The pollution detecting method according to claim 7, characterized in that the step 5 comprises:

the detected soil electrical conductivity $EC_{soil}$ is substituted into the following formula to calculate a content of soil ionic pollutants:

$$EC_{soil} = a \cdot c_{ionic} + EC_{surface}$$

wherein $EC_{soil}$ is the soil electrical conductivity, $EC_{surface}$ is a soil surface electrical conductivity, $c_{ionic}$ is the content of the ionic pollutants, and a is a calculation parameter.

9. The pollution detecting method according to claim 7, characterized in that the step 5 comprises:

the detected fluorescence intensity $FI_{325}$ under the excitation of 325 nm UV light is substituted into the following formula to calculate the content of the soil humic acid:

$$FI_{325} = b \cdot c_{humic} + d$$

wherein $FI_{325}$ is the fluorescence intensity under the excitation of 325 nm UV light, $c_{humic}$ is the content of the humic acid, and b and d are calculation parameters.

10. The pollution detecting method according to claim 7, characterized in that the step 5 comprises:

the detected fluorescence intensity $FI_{280}$ under the excitation of 280 nm UV light is substituted into the following formula to calculate the content of the polycyclic aromatic hydrocarbons in the soil:

$$FI_{280} = e \cdot c_{PAHs} + f$$

wherein $FI_{280}$ is the fluorescence intensity under the excitation of 280 nm UV light, $c_{PAHs}$ is the content of the polycyclic aromatic hydrocarbons, and e and f are calculation parameters.

* * * * *